US012503817B2

(12) United States Patent
Nishino et al.

(10) Patent No.: US 12,503,817 B2
(45) Date of Patent: Dec. 23, 2025

(54) METHOD FOR PRODUCING SHEET FOR HEAT-INSULATING FOAMED PAPER CONTAINER

(71) Applicant: NISSIN FOODS HOLDINGS CO., LTD., Osaka (JP)

(72) Inventors: Yoshitsugu Nishino, Osaka (JP); Noboru Omori, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 1126 days.

(21) Appl. No.: 17/281,152

(22) PCT Filed: Feb. 18, 2020

(86) PCT No.: PCT/JP2020/006155
§ 371 (c)(1),
(2) Date: Mar. 29, 2021

(87) PCT Pub. No.: WO2020/171031
PCT Pub. Date: Aug. 27, 2020

(65) Prior Publication Data
US 2021/0340709 A1    Nov. 4, 2021

(30) Foreign Application Priority Data

Feb. 20, 2019   (JP) .................................. 2019-028274

(51) Int. Cl.
*B29C 44/32* (2006.01)
*B32B 5/18* (2006.01)
(Continued)

(52) U.S. Cl.
CPC ........... *D21H 23/64* (2013.01); *B29C 44/321* (2016.11); *B32B 5/18* (2013.01); *B32B 5/20* (2013.01);
(Continued)

(58) Field of Classification Search
CPC .................................................... B32B 37/153
See application file for complete search history.

(56) References Cited

U.S. PATENT DOCUMENTS

| 4,435,344 A | 3/1984 | Iioka |
| 6,521,734 B1 * | 2/2003 | Araki .................... B32B 37/153 526/352.2 |

(Continued)

FOREIGN PATENT DOCUMENTS

| JP | S57-110439 | 7/1982 |
| JP | H05-042929 | 2/1993 |

(Continued)

OTHER PUBLICATIONS

English machine translation of WO2008/038750 (Year: 2008).*
(Continued)

*Primary Examiner* — Scott W Dodds
(74) *Attorney, Agent, or Firm* — HSML P.C.

(57) ABSTRACT

[Problem] The problem that unevenness occurs in the foam layer and the insulating property deteriorates when lamination is carried out at high speed was clarified in a process for producing a sheet for a foam insulating paper container. Specifically, the problem addressed by the present invention is to provide a sheet for a foam insulating paper container that can be foamed without unevenness even when laminated at high speed.

[Solution] The present inventors discovered that the problem addressed by the present invention can be solved by a method for producing a sheet for a foam insulating paper container in which a polyethylene resin is laminated on at least one side of a paper substrate, wherein the method for producing a sheet for a foam insulating paper container is (Continued)

characterized in that the lamination conditions are an air gap of 150 mm or greater and a take-off speed of 70 m/min or higher.

4 Claims, 1 Drawing Sheet

(51) Int. Cl.

| | | |
|---|---|---|
| B32B 5/20 | (2006.01) | |
| B32B 27/06 | (2006.01) | |
| B32B 27/10 | (2006.01) | |
| B32B 27/32 | (2006.01) | |
| B32B 29/00 | (2006.01) | |
| B32B 37/15 | (2006.01) | |
| B65D 65/40 | (2006.01) | |
| B65D 81/38 | (2006.01) | |
| D21F 11/00 | (2006.01) | |
| D21H 23/30 | (2006.01) | |
| D21H 23/64 | (2006.01) | |
| D21H 27/10 | (2006.01) | |

(52) U.S. Cl.
CPC ............ *B32B 27/065* (2013.01); *B32B 27/10* (2013.01); *B32B 27/32* (2013.01); *B32B 29/007* (2013.01); *B32B 37/153* (2013.01); *B65D 65/40* (2013.01); *B65D 81/3867* (2013.01); *D21F 11/002* (2013.01); *D21H 23/30* (2013.01); *D21H 27/10* (2013.01); *B29K 2023/06* (2013.01); *B32B 2266/025* (2013.01); *B32B 2307/7246* (2013.01); *B32B 2439/00* (2013.01)

(56) References Cited

U.S. PATENT DOCUMENTS

| | | | |
|---|---|---|---|
| 2006/0286325 | A1 | 12/2006 | Swoboda et al. |
| 2010/0112335 | A1* | 5/2010 | Suzuki ............... B29C 48/9155 |
| | | | 428/318.6 |
| 2015/0274856 | A1 | 10/2015 | Berbee et al. |
| 2016/0319053 | A1 | 11/2016 | Berbee et al. |
| 2018/0319910 | A1 | 11/2018 | Berbee et al. |

FOREIGN PATENT DOCUMENTS

| | | | |
|---|---|---|---|
| JP | 2001-097355 | | 4/2001 |
| JP | 2005-119147 | | 5/2005 |
| JP | 2007-090662 | | 4/2007 |
| JP | 2007-168178 | | 7/2007 |
| JP | 2008-105747 | | 5/2008 |
| JP | 2010-046881 | | 3/2010 |
| JP | 2012-214038 | | 11/2012 |
| JP | 2015-535035 | | 12/2015 |
| JP | 2017-226124 | | 12/2017 |
| JP | 2018-094906 | | 6/2018 |
| JP | 2019-111650 | | 7/2019 |
| WO | WO-2008038750 | A1 * | 4/2008 ............ B32B 27/10 |
| WO | 2008/129653 | | 10/2008 |

OTHER PUBLICATIONS

International Search Report and Written Opinion of PCT/JP2020/006155, Apr. 21, 2020, 11 pages including English translation of the International Search Report.

Office Action issued for Japanese Patent Application No. 2019-028274, May 31, 2022, 12 pages including machine translation.

* cited by examiner

METHOD FOR PRODUCING SHEET FOR HEAT-INSULATING FOAMED PAPER CONTAINER

TECHNICAL FIELD

The present invention relates to a method for producing a sheet for a heat-insulating foamed paper container.

BACKGROUND ART

In general, heat-insulating containers are used for containers for instant cup noodles and containers for hot foods and drinks such as coffee and soup.

Containers made of foamed polystyrene are conventionally known as heat-insulating containers to be used for such applications. However, such containers are bulky because their whole bodies are foamed, and the bulkiness disadvantageously leads to increased garbage. In addition, their strength is lower than those of containers made of paper, causing a problem in that hard contents (e.g., noodle lumps) contained in such containers easily brake during transportation.

Techniques are disclosed to solve the problems (Patent Literatures 1 to 3), wherein a heat-insulating foamed paper container is produced in such a manner that a polyethylene resin with low melting point is laminated on the outer wall surface of a paper container and foamed by heating with utilizing the vapor pressure of moisture contained in paper which is the substrate. However, it is disadvantageously difficult to control the foamed layer (heat-insulating layer).

Examples of known methods to control the foamed layer include a method of controlling the composition of polyethylene resin and the moisture content and basis weight of a paper substrate (Patent Literature 4), a method of controlling the Oken smoothness and air resistance of a surface of a paper substrate onto which a polyethylene layer is to be laminated (Patent Literature 5), and a method of controlling the molecular weight distribution, melt flow rate, and melt strength of polyethylene resin (Patent Literature 6).

CITATION LIST

Patent Literature

Patent Literature 1: Japanese Patent Laid-Open No. 57-110439
Patent Literature 2: Japanese Patent Laid-Open No. 05-042929
Patent Literature 3: Japanese Patent Laid-Open No. 2001-097355
Patent Literature 4: Japanese Patent Laid-Open No. 2007-168178
Patent Literature 5: Japanese Patent Laid-Open No. 2012-214038
Patent Literature 6: Japanese Patent Laid-Open No. 2018-094906

SUMMARY OF INVENTION

Technical Problem

On the basis of the prior arts, the present inventors have clarified a problem in lamination at high speed in the process of producing a sheet for a heat-insulating foamed paper container; specifically, unevenness is generated in the foamed layer to result in lowered heat-insulating properties.

Thus, an object of the present invention is to provide a sheet for a heat-insulating foamed paper container, wherein the sheet can be foamed without any unevenness even when being laminated at high speed.

Solution to Problem

The present inventors have found that the object of the present invention is achieved with a method for producing a sheet for a heat-insulating foamed paper container, the method including laminating a polyethylene resin on at least one surface of a paper substrate, wherein lamination conditions include an air gap of 150 mm or larger and a drawing speed of 70 m/min or higher.

Advantageous Effects of Invention

The completion of the present invention enables, even after laminating at high speed in production of a sheet for a heat-insulating foamed paper container, the realization of a suitable foamed layer in the subsequent foaming step.

DESCRIPTION OF EMBODIMENTS

Figure 1:
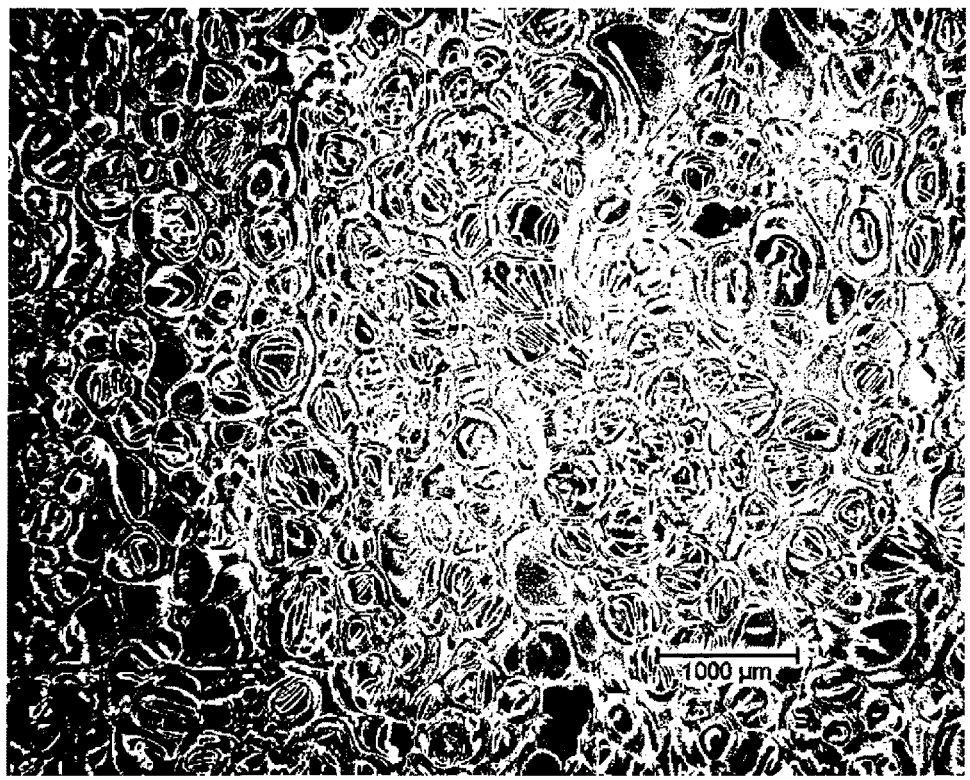
FIG. 1 shows an enlarged planar image of a foamed layer when sheet C3 (Example 3) was foamed, presenting a reference for "good" in appearance evaluation. It can be seen that fine, uniform foam cells are present in the foamed layer.

The present invention relates to a method for producing a sheet for a heat-insulating foamed paper container, the method including laminating a polyethylene resin on at least one surface of a paper substrate, wherein lamination conditions include an air gap of 150 mm or larger and a drawing speed of 70 m/min or higher. Hereinafter, the details will be described.

Paper Substrate

The paper substrate to constitute the sheet for a heat-insulating foamed paper container of the present invention is not limited, and Kraft paper and woodfree paper can be used. In order to achieve toughness for containers, the basis weight of the paper substrate is preferably 150 to 400 g/m$^2$, and more preferably 250 to 350 g/m$^2$. Further, in order to foam polyethylene in a preferred manner, the moisture contained in the paper substrate is preferably 5 to 10% by weight, and more preferably 6 to 8% by weight.

Polyethylene Resin

The polyethylene resin in the present invention is an essential component in the present invention because of its superiority in laminate suitability and foaming properties. Unless otherwise specified, the polyethylene resin in the present invention refers to a low-density polyethylene resin (density: 910 to 925 kg/m$^3$, melting point: 105 to 120° C.). Medium-density polyethylene resins (density: 925 to 940 kg/m$^3$, melting point: 115 to 130° C.) and high-density polyethylene resins (density: 940 to 970 kg/m$^3$, melting point: 125 to 140° C.) each have a high melting point and poor foaming properties, and hence are not used for foaming in general.

Further, the melt strength (also referred to as "MS" hereinafter) of the low-density polyethylene resin at a temperature of 130° C. and a drawing speed of 10 m/min is preferably 70 to 120 mN, and more preferably 80 to 100 mN. In the present invention, it is necessary to set the air gap to 150 mm or larger for obtaining a good foamed layer, and the details will be described later. Whereas, larger air gaps are likely to cause a problem of neck-in in laminating, and this tendency is particularly significant if the melt strength is lower than 70 mN. For this reason, it is preferable to set the melt strength of the polyethylene resin to 70 mN or higher, and it is more preferable to set the melt strength of the polyethylene resin to 80 mN or higher.

Neck-in is a phenomenon that when a polyethylene resin is extruded with a T-die extruder to form a film, the width of the extruded polyethylene resin film becomes excessively smaller than the effective width of the T-die. If merely a small film width is generated, this can be solved only by increasing the effective width of the T-die. However, terrible neck-in causes thickening of each end portion of the polyethylene resin film, which leads to the increase in disposal volume owing to removal of the thickened portions, resulting in significantly lowered productivity.

If the melt strength is over 120 mN, on the other hand, the polyethylene resin tends to be oriented in lamination to result in deteriorated foamed appearance. Hence, it is preferable to set the melt strength of the polyethylene resin to 120 mN or lower, and it is more preferable to set the melt strength of the polyethylene resin to 100 mN or lower.

The melt flow rate (also referred to as "MFR" hereinafter) of the polyethylene resin is preferably 8 to 28 g/10 min, and more preferably 10 to 20 g/10 min. This range allows the polyethylene resin to stably foam, and hence provides good heat-insulating properties and good appearance after foaming.

Conditions for Extrusion Lamination

An appropriate method of extrusion lamination can be selected from single lamination methods, tandem lamination methods, sandwich lamination methods, coextrusion lamination methods, and so on.

The temperature of the polyethylene resin (immediately beneath the T-die) in lamination is preferably 260 to 350° C., and more preferably 280 to 330° C. This range can provide a preferred laminate strength between the polyethylene resin layer and the paper substrate and a preferred appearance after foaming. It is preferable to control the surface temperature of a cooling roll in the range of 10 to 50° C.

The thickness of the polyethylene resin layer after lamination (before foaming) is not limited, and preferably 30 to 150 μm, and more preferably 40 to 100 μm. This range can impart a sufficient thickness to the polyethylene resin layer after foaming, and hence good heat-insulating properties are provided.

The drawing speed in the present invention is 70 m/min or higher. If the drawing speed is lower than 70 m/min, a uniform foamed layer can be formed even without implementation of the present invention, and the details will be described later. Therefore, implementation of the present invention is not necessary if the drawing speed is lower than 70 m/min. If the drawing speed is 80 m/min or higher, the advantageous effects of the present invention are more significant.

If the drawing speed is excessively high, the polyethylene resin undergoes neck-in to result in lower productivity, and hence the drawing speed is preferably 130 m/min or lower, and more preferably 110 m/min or lower.

Next, the air gap will be described. Herein, the air gap refers to the distance from the extrusion exit of the T-die to nip rolls.

The air gap in lamination is needed to be 150 mm or larger, and more preferably 160 mm or larger. Extension of the air gap enables lamination while retaining an oxide film generated on the surface of the polyethylene resin, and hence a good foamed layer can be obtained. The details will be described later.

By contrast, excessive extension of the air gap causes neck-in to the polyethylene resin to result in lowered productivity, and thus with respect to the upper limit, the air gap is preferably 250 mm or smaller, and more preferably 200 mm or smaller.

Although the details of the mechanism are not clear, the present inventors infer as follows.

During the passing of the polyethylene resin through the air gap, an oxide film is generated on the surface of the resin. Since this oxide film is tougher than the polyethylene resin layer in the inner side, the oxide film can contribute to the formation of a uniform foamed layer by suppressing partial excessive foaming. Accordingly, it is important to laminate with retaining the oxide film.

However, the oxide film is likely to be lost principally in stretching the polyethylene resin with nip rolls. Specifically, force to extend the resin and force to push the resin in are instantly applied in nipping and thus cause the oxide film to break or to mix with the inner resin, resulting in the loss of the oxide film.

Lowering of the drawing speed is contemplated as a method for retaining the oxide film. If the drawing speed is lowered, the speed of nip rolls is also lowered, and as a result the manner of application of force becomes slow to allow stretching with the oxide film retained. However, lowering of the drawing speed disadvantageously leads to lowered productivity.

The present inventors solved this problem by extending the air gap.

In general, the thickness of a polyethylene resin extruded from a T-die is not uniform, being the largest immediately after the polyethylene resin is extruded from the T-die, and the smallest immediately before the polyethylene resin is nipped. Moreover, if the air gap is extended, the thickness of the polyethylene resin immediately before nipping becomes even smaller than that before extending the air gap. For this reason, extension of the air gap provides the polyethylene resin immediately before nipping with a smaller thickness to slow down the application of force to the polyethylene resin in nipping, and hence the loss of the oxide film can be suppressed.

Next, air gap-passing time will be described. Here, air gap-passing time refers to the period of time in which the polyethylene resin extruded from the T-die passes through the air gap.

With respect to the lower limit, the air gap-passing time is preferably 0.08 seconds or longer, and more preferably 0.10 seconds or longer. As described above, although the oxide film formed on the surface of the polyethylene resin is important to obtain a uniform foamed layer, the oxide film is insufficiently formed if the air gap-passing time is excessively short. When a sufficient air gap-passing time cannot be ensured (e.g., 0.04 seconds), treatment with ozone gas and/or oxygen gas can achieve the same effect as prolongation of the air gap-passing time.

With respect to the upper limit, the air gap-passing time is preferably 0.30 seconds or shorter, and more preferably 0.20 seconds or shorter. Excessively long air gap-passing time causes neck-in to the polyethylene resin to result in lowered productivity, and thus is not preferable.

In the present invention, it is preferable to perform surface treatment with ozone gas and/or oxygen gas while the polyethylene resin is passing through the air gap. Surface treatment with ozone gas and/or oxygen gas can promote the formation of the oxide film and improve the adhesive strength to the substrate layer. The amount of ozone gas and/or oxygen gas for treatment is not limited, and preferably 0.5 mg/m$^2$ or more for promotion of the oxidation of the polyethylene resin.

EXAMPLES

An MS adjustment resin was blended with low-density polyethylene (B1) to produce low-density polyethylene resins (B2) to (B5). Low-density polyethylene resins (B1) to (B5) are as shown in Table 1. Low-density polyethylene resin (B1) and the MS adjustment resin are as follows.

Low-density polyethylene resin (B1): "Petrothene 07C03C" manufactured by Tosoh Corporation, MFR: 15 g/10 min, density: 918 kg/m$^3$, melt strength (temperature: 130° C., drawing speed: 10 m/min): 115 mN
MS adjustment resin (ethylene-1-hexene copolymer): MFR: 12 g/10 min, density: 905 kg/m$^3$, MS (temperature: 190° C., drawing speed: 10 m/min): 2 mN

TABLE 1

| | Low-density polyethylene resin | | | | |
|---|---|---|---|---|---|
| | B1 | B2 | B3 | B4 | B5 |
| MS130° C. (mN) | 115 | 105 | 93 | 84 | 70 |

Example 1

(Step 1) Medium-density polyethylene resin (A1) was extrusion-laminated on one surface of a paper substrate to form a water vapor barrier layer. (Step 2) Subsequently, low-density polyethylene resin (B3) was extrusion-laminated on the non-laminated surface to form a foamed layer, and thus sheet for a heat-insulating foamed paper container C1 (referred to as "sheet C1" hereinafter) was produced. Detailed lamination conditions are as follows.

(Step 1)
Paper substrate: moisture content: 23 g/m$^2$, basis weight: 320 g/m$^2$
Medium-density polyethylene resin (A1): "Petrothene LW04-1" manufactured by Tosoh Corporation, MFR: 6.5 g/10 min, density: 940 kg/m$^3$
Extrusion temperature (T-die exit temperature): 320° C.
Drawing speed (lamination speed): 80 m/min
Air gap: 130 mm
Air gap-passing time: 0.10 seconds
Thickness: 40 μm (thickness of center portion of polyethylene resin layer)

(Step 2)
Low-density polyethylene resin (B3): melt strength (temperature: 130° C., drawing speed: 10 m/min): 93 mN
Extrusion temperature (T-die exit temperature): 310° C.
Drawing speed (lamination speed): 80 m/min
Air gap: 150 mm
Air gap-passing time: 0.11 seconds
Thickness: 70 μm (thickness of center portion of polyethylene resin layer)

The low-density polyethylene resin, air gap, and drawing speed in Example 1 were changed as shown in Tables 2 to 5 to produce sheets C2 to C14 (Examples 2 to 14) and sheets D1 to D5 (Comparative Examples 1 to 5).

Each of sheets C2 to C14 and sheets D1 to D5 was heated at 120° C. for 6 minutes to foam, and the appearance of the foamed layer was evaluated. The evaluation criteria are as shown below. Sheets D1 and D2 are acceptable for practical use in terms of both appearance and neck-in; however, the drawing speed and thus the productivity are low, and hence sheets D1 and D2 do not achieve the object of the present invention.

Figure 2:
FIG. 2 shows an enlarged planar image of a foamed layer when sheet D3 (Comparative Example 3) was foamed, presenting a reference for "poor" in appearance evaluation. It can be seen that foam cells are bloated and nonuniform.

(Appearance Evaluation)
The surface of each foamed layer was observed by using a stereoscopic microscope ("MULTIZOOM AZ100M (camera: DS-Ri1)" manufactured by Nikon Corporation). Then, when fine, uniform foam cells as in Example 3 (FIG. 1) were observed, the foamed layer was rated as "good", when large, nonuniform foam cells as shown for Comparative Example 3 (FIG. 2) were observed, the foamed layer was rated as "poor", and when the surface appearance between Example 3 and Comparative Example 3 was observed, the foamed layer was rated as "fair".

(Neck-in)
Neck-in was evaluated by comparing the thickness of an end portion of each polyethylene resin layer after lamination with the thickness of the center portion (70 μm). The specific criteria are as follows.
Good: the area having a thickness of 75 μm (1.07 times the thickness of the center portion) or more was less than 3%
Fair: the area having a thickness of 75 μm (1.07 times the thickness of the center portion) or more was 3% or more and less than 10%
Poor: the area having a thickness of 75 μm (1.07 times the thickness of the center portion) or more was 10% or more

TABLE 2

| Table 2 | Example 1 Sheet C1 | Example 2 Sheet C2 | Example 3 Sheet C3 | Example 4 Sheet C4 | Example 5 Sheet C5 | Example 6 Sheet C6 |
|---|---|---|---|---|---|---|
| MS 130° C. (mN) | 93 (B3) | 93 (B3) | 93 (B3) | 93 (B3) | 93 (B3) | 93 (B3) |
| Air gap (mm) | 150 | 160 | 170 | 190 | 210 | 230 |
| Drawing speed (m/min) | 80 | 80 | 80 | 80 | 80 | 80 |
| Air gap-passing time (sec) | 0.11 | 0.12 | 0.13 | 0.14 | 0.16 | 0.17 |
| Appearance evaluation | fair | good | good (reference) | good | good | good |
| Neck-in | good | good | good | good | fair | poor |

TABLE 3

| Table 3 | Example 3 Sheet C3 | Example 7 Sheet C7 | Example 8 Sheet C8 | Example 4 Sheet C4 | Example 9 Sheet C9 | Example 10 Sheet C10 |
|---|---|---|---|---|---|---|
| MS 130° C. (mN) | 93 (B3) | 93 (B3) | 93 (B3) | 93 (B3) | 93 (B3) | 93 (B3) |
| Air gap (mm) | 170 | 170 | 170 | 190 | 190 | 190 |
| Drawing speed (m/min) | 80 | 100 | 120 | 80 | 100 | 120 |
| Air gap-passing time (sec) | 0.13 | 0.10 | 0.09 | 0.14 | 0.11 | 0.10 |
| Appearance evaluation | good (reference) | good | fair | good | good | good |
| Neck-in | good | fair | poor | good | fair | poor |

TABLE 4

| | Example 11 Sheet C11 | Example 12 Sheet C12 | Example 13 Sheet C13 | Example 14 Sheet C14 |
|---|---|---|---|---|
| MS 130° C. (mN) | 115 (B1) | 105 (B2) | 84 (B4) | 70 (B5) |
| Air gap (mm) | 170 | 170 | 170 | 170 |
| Drawing speed (m/min) | 80 | 80 | 80 | 80 |
| Air gap-passing time (sec) | 0.13 | 0.13 | 0.13 | 0.13 |
| Appearance evaluation | fair | fair | good | good |
| Neck-in | good | good | fair | poor |

TABLE 5

| | Comparative Example 1 Sheet D1 | Comparative Example 2 Sheet D2 | Comparative Example 3 Sheet D3 | Comparative Example 4 Sheet D4 | Comparative Example 5 Sheet D5 |
|---|---|---|---|---|---|
| MS 130° C. (mN) | 93 (B3) | 93 (B3) | 93 (B3) | 93 (B3) | 93 (B3) |
| Air gap (mm) | 130 | 130 | 130 | 130 | 130 |
| Drawing speed (m/min) | 40 | 60 | 80 | 100 | 120 |
| Air gap-passing time (sec) | 0.20 | 0.13 | 0.10 | 0.08 | 0.07 |
| Appearance evaluation | good | fair | poor (reference) | poor | poor |
| Neck-in | good | good | good | fair | poor |

Extension of the air gap improved the appearance of the foamed layer (Table 2, Comparative Example 3), and successfully suppressed the deterioration of appearance even at higher drawing speed (Table 3, Table 5). Moreover, adjustment of the melt strength of polyethylene resin improved the appearance and neck-in (Table 4).

The invention claimed is:

1. A method for producing a sheet for a heat-insulating foamed paper container, the method comprising laminating on at least one surface of a paper substrate, a resin comprising a low-density polyethylene so as to form a foamed layer comprising the low-density polyethylene,
    wherein in the heat-insulating foamed paper container, the foamed layer, the paper substrate, and a water vapor barrier layer are stacked in this order,
    the water vapor barrier layer comprises a middle-density polyethylene,
    a melt strength of the resin at a temperature of 130° C. and a drawing speed of 10 m/min is in a range from 80 mN to 120 mN, and
    lamination conditions include an air gap in a range from 160 mm to 200 mm, and a drawing speed in a range from 80 m/min to 110 m/min.

2. The method for producing the sheet for a heat-insulating foamed paper container according to claim 1, wherein a passing time of the resin through the air gap is in a range from 0.10 seconds to 0.30 seconds.

3. The method for producing the sheet for a heat-insulating foamed paper container according to claim 1, wherein a surface treatment is performed with ozone gas, oxygen gas, or a combination thereof, during a passing of the resin through the air gap.

4. The method for producing the sheet for a heat-insulating foamed paper container according to claim 1, wherein after the laminating, the resin has a thickness in a range from 30 to 150 μm.

* * * * *